(12) United States Patent
Vora

(10) Patent No.: US 9,230,249 B1
(45) Date of Patent: Jan. 5, 2016

(54) INTERACTIVE SHOPPING SYSTEM AND METHOD

(71) Applicant: Jigesh V. Vora, Houston, TX (US)

(72) Inventor: Jigesh V. Vora, Houston, TX (US)

(73) Assignee: VJV CONSULTING INC., Houston, TX (US)

( * ) Notice: Subject to any disclaimer, the term of this patent is extended or adjusted under 35 U.S.C. 154(b) by 0 days.

(21) Appl. No.: 14/714,076

(22) Filed: May 15, 2015

Related U.S. Application Data

(60) Provisional application No. 62/139,404, filed on Mar. 27, 2015.

(51) Int. Cl.
*G06Q 20/00* (2012.01)
*G06Q 20/20* (2012.01)
*G06Q 30/06* (2012.01)

(52) U.S. Cl.
CPC ............ *G06Q 20/202* (2013.01); *G06Q 20/204* (2013.01); *G06Q 20/208* (2013.01); *G06Q 30/0633* (2013.01); *G06Q 30/0639* (2013.01)

(58) Field of Classification Search
CPC ..................................................... G06Q 20/204

USPC ............................................................ 705/17
See application file for complete search history.

(56) References Cited

U.S. PATENT DOCUMENTS

| 6,484,939 B1 * | 11/2002 | Blaeuer ........................ 235/383 |
| 2003/0015585 A1 * | 1/2003 | Wike et al. ..................... 235/383 |
| 2012/0284132 A1 * | 11/2012 | Kim et al. ....................... 705/20 |
| 2014/0001258 A1 * | 1/2014 | Chan et al. .................... 235/385 |
| 2015/0039462 A1 * | 2/2015 | Shastry et al. ............... 705/26.7 |

* cited by examiner

*Primary Examiner* — Hunter Wilder
(74) *Attorney, Agent, or Firm* — Buskop Law Group, PC; Wendy Buskop

(57) ABSTRACT

An interactive shopping system and method for use in a retail store. The system can include a removable sleeve which can be attached to a shopping cart or basket. The system can have a scanner for reading product codes and retrieving information on specific products and an onboard scale to match the product weight as products are placed in the cart or basket. A processor can be in communication with a network and configured to match products codes in real time to a store library of products. A display can be used to market products that might interest the user based on the user's shopping list and shopping history at the store. A light array and alarm system can be mounted to the removable sleeve to provide a visual or audible alarm to indicate the status of payment or nonpayment of products in the cart or basket.

15 Claims, 6 Drawing Sheets

FIGURE 3

| | |
|---|---|
| STORE LIBRARY | 32 |
| PRODUCT NAMES | 40 |
| PRODUCT WEIGHTS | 41 |
| PRODUCT SPECIFICATIONS | 42 |
| PRODUCT PRICES | 43 |
| PRODUCT DISCOUNTS | 44 |
| STORE COUPONS | 45 |
| MANUFACTURER RECALLS | 46 |
| MANUFACTURER COUPONS | 47 |
| MANAGER SPECIALS | 48 |
| DIGITAL ADVERTISEMENTS | 49 |
| INTERACTIVE MAP | 50 |

FIGURE 4A

| | |
|---|---|
| SELECTING A ROLLING CART OR BASKET HAVING AT LEAST ONE ONBOARD PROCESSOR, ONBOARD DATA STORAGE, ONBOARD SCANNER, ONBOARD SCALE, AND GLOBAL POSITIONING SYSTEM TRANSMITTER, WHICH CAN ALL BE CONNECTED TO AN ONBOARD POWER SUPPLY | 100 |
| SYNCHRONIZING AT LEAST ONE USER CLIENT DEVICE TO THE ONBOARD PROCESSOR | 102 |
| UPLOADING A SHOPPING LIST FROM THE USER CLIENT DEVICE TO THE ONBOARD PROCESSOR | 104 |
| USING THE ONBOARD PROCESSOR TO MATCH PRODUCTS FROM THE AT LEAST ONE USER'S SHOPPING LIST TO PRODUCT LOCATIONS ON THE INTERACTIVE MAP AND THEN DISPLAY THE INTERACTIVE MAP AS A CUSTOMIZED MAP IDENTIFYING THE LOCATION OF THE PRODUCTS FROM THE USER'S SHOPPING LIST ON THE ONBOARD DISPLAY | 106 |
| USING THE ONBOARD PROCESSOR TO STORE THE CUSTOMIZED INTERACTIVE MAP IN THE ONBOARD DATA STORAGE | 108 |
| USING THE ONBOARD PROCESSOR TO COLOR CODE PRODUCTS ON THE USER'S SHOPPING LIST AS A FIRST COLOR OR COLOR CODE PRODUCTS AS A SECOND COLOR TO DENOTE PRODUCTS THAT ARE DEEMED "SPECIALS" BY THE RETAILER | 110 |
| SCANNING PRODUCTS WITH THE ONBOARD SCANNER AS EACH PRODUCT IS SCANNED BY THE ONBOARD SCANNER, WEIGHED BY THE ONBOARD SCALE, AND COMBINATIONS THEREOF AS THE PRODUCTS ARE PLACED INTO THE ROLLING CART OR BASKET | 112 |
| USING THE ONBOARD PROCESSOR TO MATCH THE SCANNED AND/OR WEIGHED PRODUCT THAT HAS BEEN PLACED INTO THE ROLLING CART OR BASKET TO THE STORE LIBRARY CONTAINING PRODUCT CODES AND WEIGHTS FOR THE PRODUCTS IN THE RETAIL STORE AND OBTAINS A PRICE LINKED TO THE WEIGHT OF THE SCANNED PRODUCT | 114 |
| USING THE ONBOARD PROCESSOR TO PROVIDE AN ALARM WHEN THE WEIGHT OF THE SCANNED PRODUCT PLACED INTO THE ROLLING CART OR BASKET DOES NOT MATCH THE INFORMATION IN THE STORE LIBRARY | 115 |
| USING THE ONBOARD PROCESSOR TO PRESENT A RUNNING TOTAL OF THE SCANNED AND WEIGHED PRODUCTS TO THE USER | 116 |
| USING THE ONBOARD PROCESSOR TO PRESENT A METER SHOWING HOW MANY PRODUCTS ARE LEFT TO SELECT FROM THE USER'S SHOPPING LIST | 118 |
| USING THE ONBOARD PROCESSOR TO RECEIVE ADVERTISEMENTS AND SPECIALS FROM THE ADMINISTRATIVE PROCESSOR AND PRESENT THE ADVERTISEMENTS AND SPECIALS AT TIMED INTERVALS ON THE ONBOARD DISPLAY OR THE DISPLAY OF THE USER CLIENT DEVICE THROUGHOUT THE SHOPPING EXPERIENCE | 120 |
| SCANNING COUPONS USING THE ONBOARD SCANNER OR UPLOADING COUPONS SAVED ON THE USER CLIENT DEVICE TO THE ONBOARD PROCESSOR | 122 |
| USING THE ONBOARD PROCESSOR TO AUTOMATICALLY APPLY COUPONS APPLICABLE TO PRODUCTS THAT WERE SELECTED, SCANNED AND PLACED IN THE ROLLING CART OR BASKET AND PRESENTING THE DISCOUNTED SUBTOTALS TO THE USER | 124 |
| USING THE ONBOARD PROCESSOR TO AUTOMATICALLY INDICATE THAT THE SELECTED PRODUCTS ARE "CHECKED OFF" THE USER'S SHOPPING LIST | 126 |

(4B)

INTERACTIVE SHOPPING SYSTEM AND METHOD

CROSS REFERENCE TO RELATED APPLICATIONS

The present application claims priority to and the benefit of U.S. Provisional Patent Application Ser. No. 62/139,404 filed on Mar. 27, 2015, entitled "INTERACTIVE SHOPPING SYSTEM AND METHOD". This reference is hereby incorporated in its entirety.

FIELD

The current embodiments generally relate to a system and method for interactive shopping.

BACKGROUND

A need exists to provide critical user data/information that will allow brick and mortar retail stores to compete with the online stores by providing analytics and user data that currently cannot be tracked and is unavailable for users that walk into retail stores.

A further need exists for an overall better customer experience at retail stores.

A further need exists for more efficient security in retail stores.

The present embodiments meet these needs.

BRIEF DESCRIPTION OF THE DRAWINGS

The detailed description will be better understood in conjunction with the accompanying drawings as follows:

FIG. 3 depicts the store library according to one or more embodiments.

FIGS. 4A-4B depict the steps of the method for using the interactive shopping system according to one or more embodiments.

Figure 1:
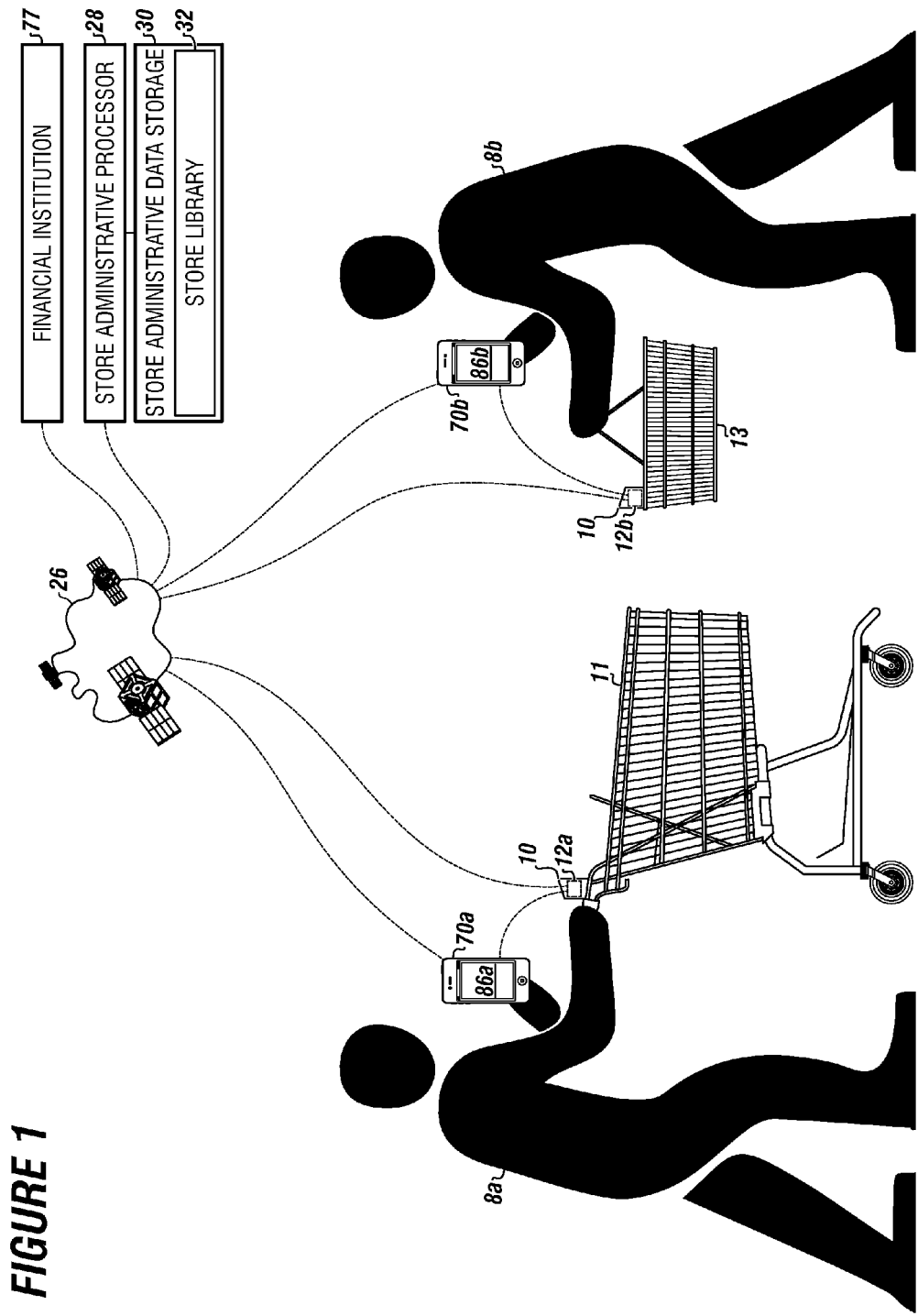
FIG. 1 depicts the interactive shopping system according to one or more embodiments.

The present embodiments are detailed below with reference to the listed Figures.

DETAILED DESCRIPTION OF THE EMBODIMENTS

Before explaining the present system and method in detail, it is to be understood that the system and method are not limited to the particular embodiments and that it can be practiced or carried out in various ways.

The current embodiments generally relate to a system and method for interactive shopping.

Currently, standing in checkout lines at retail stores is time consuming, frustrating, and can negatively affect the customer experience at retail stores.

A benefit of this invention is that the interactive shopping system can save time and provide a more efficient and positive shopping experience.

The term "administrative processor" as used herein can refer to a laptop, a computer, a portable handheld device, such as a cellular phone or a tablet computer, combinations thereof, or any device capable of at least two way communications, which can be configured to communicate with a network.

The term "store administrative data storage" as used herein can refer to the memory area, which can be a cloud based memory area that can store a store library and other information related to retail stores using the interactive shopping system. The store administrative data storage can include "chain wide" coupon programs and "chain wide" tracking of rolling carts or baskets of the interactive shopping system by store locations for an owner or manager of a chain to view.

The term "network" as used herein can refer to a cellular network, a satellite network, the internet, a Wi-Fi network, a global communication network, a local area network, a wide area network, a similar network, or combinations thereof.

The term "onboard data storage" as used herein can refer to a memory area connected to at least one onboard processor that contains prices of products in a retail store, coupon information for items in the retail store, and user log in data as the at least one user is using the rolling cart or basket. The onboard data storage can include a unique identifier for the rolling cart or basket. In embodiments, the onboard data storage can have a unique identifier for the retail store by location or by chain.

The term "product prices" as used herein can refer to the prices of products stored in the store library. The product prices can be connected to known product weights for each product. In embodiments, the product prices can include product specifications and can include a picture of the product, the name of the product, the type of product, the manufacturer, ingredients, calorie content, and warning information.

The term "list of purchases" as used herein can refer to a list of scanned products which can be in the rolling cart or basket and which can be displayed on the onboard display of the rolling cart or basket. The list of purchases can not only include the name and price of the purchases, but also the quantity of the purchases, and any applied discounts for all the scanned products.

The term "user client device" as used herein can refer to a cellular phone, a smart phone, a tablet computer, a smart watch, a laptop, a personal digital assistant, or any known device that is capable of at least two way communications, which can communicate and process information.

The term "client device connector" as used herein can refer to a plug, a computer bus and power connector, a USB cable, or other cable or mechanism that allows at least one user client device, such as a cellular phone to sync wirelessly or in a wired configuration to the at least one onboard processor.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "global positioning system transmitter" as used herein can refer to a device connected to the at least one onboard processor which provides a signal to a store processor allowing the geographic location of the rolling cart or basket to appear on a geographic map of the store.

The term "onboard display" as used herein can refer to a device in communication with the at least one onboard processor for the visual presentation of data at the shopping cart or the basket. The onboard display can be a flexible or rigid, touch or voice activated display, such as a monitor, an LCD screen, a laptop computer, a portable handheld device, such as a cellular phone or a tablet computer, combinations thereof, or any known device that is capable of at least two way communications. In embodiments, the onboard display can be a display of at least one connected user client device.

The term "onboard scanner" as used herein can refer to a bar code scanner, a laser scanner, or similar product scanner used in a retail outlet to identify a product for purchase. The onboard scanner can be connected to the at least one onboard processor, the onboard power supply, and further connected to a removable sleeve to scan products in the basket or rolling cart.

In embodiments, the removable sleeve can house the onboard display or LCD screen, which can display product names, product discounts, store coupons, manufacturer recalls, manufacturer coupons, manager specials, digital advertisements, an interactive map, and combinations thereof.

In embodiments, the digital advertisements can be displayed on the side of the rolling cart or on the side of the basket.

The term "scanned product" as used herein can refer to a product picked up by at least one user that can be scanned using the onboard scanner of the rolling cart or basket of the interactive shopping system.

The term "onboard processor" can refer to a laptop, a computer, a portable handheld device, such as a cellular phone or a tablet computer, combinations thereof, or any known device capable of at least two way communications with the network of the retail store.

The term "phone application based payment system" can refer to a mobile or digital application, which can be downloaded onto a laptop, a computer, a portable handheld device, such as a cellular phone, a smart phone, a tablet computer, combinations thereof, or any device capable of at least two way communications, which can be in communication with a financial institution to provide or transfer funds for payment.

The term "onboard power supply" as used herein can refer to an electronic device that supplies electric energy to an electrical load, such as a battery. In embodiments, the power supply can be rechargeable.

The term "rolling cart" or the term "basket" as used herein can refer to any container used to hold products to be purchased while shopping at a retail store. Such containers can include, but are not limited to a handheld basket, a shopping cart, or any similar device.

The term "removable sleeve" as used herein can refer to plastic or metal removable and detachable support to go over an entire rolling cart, an entire basket, or over the handle of the basket or rolling cart and can also contain the onboard electronics described below. In embodiments, the removable sleeve can be a fitted sheet of polycarbonate or vinyl that can be placed over the rolling cart stopping above the wheels and can likewise be placed over a shopping basket. Further, the fitted sheet can support the onboard electronics.

The term "scale" as used herein can refer to any commonly used weight sensing means, such as mechanical, hydraulic, digital, or combinations thereof.

The term "store library" as used herein can refer to a database of all product codes, product prices and weights that can be purchased at a particular retail store. In embodiments, the product prices can be associated with product weights for products being sold in the retail store as well as product specifications.

The term "user financial institution" as used herein can refer to a bank, a credit card, a debit card, a pre-paid card, such as an gift card, or any institution that can provide electronic funds, such as a bank, a credit union, a savings and loan, a brokerage house or similar institution that provides credit, debit (ATM cards) or similar electronic fund transfer for point of sale purchases.

The term "real time" as used herein can refer to a continuous updating of information the instant a product is scanned or a coupon is entered into the store library. It can be expected that data will be entered in no more than a few minutes to achieve a "real time" updating of information. Real time updating can be done in a batch process or sequentially.

The term "onboard scale" as used herein can refer to a scale that can be connected to the at least one onboard processor and onboard scanner for identifying the weight of a scanned item. An onboard weight sensor can be a component of the onboard scale. The onboard scale can be connected to the at least one onboard processor and the onboard power supply and can further be connected to the removable sleeve to scan products in the basket. In embodiments, the onboard scale can be disposed above the wheels of the rolling cart The term "weight sensor" as used herein can refer to a transducer that converts an input mechanical force into an electrical output signal. In embodiment, the onboard weight sensor can be disposed above the wheels of the rolling cart.

In embodiments, the onboard weight scale and/or the weight sensors can be located above the wheels or incorporated into the casters of the rolling cart, in order to provide the overall weight of products in the basket of the cart, on the under tray or shelf area under the basket of the rolling cart, and combinations thereof.

The term "light array" as used herein can refer to an onboard display of lights, wherein the light array can alert the retail store and the shopper that a scanned product has or has not been paid for.

The term "a subtotal for the scanned products" as used herein can refer to a calculated total of the prices per scanned product which can be adjusted each time a new scanned product is placed in the rolling cart or basket. The at least one onboard processor can perform the addition to create the subtotal for the scanned products and can apply any and all known coupons from the store library.

The interactive shopping system can include an onboard point of sale system, which can be installed on or in the shopping cart. The onboard point of sale system can be in communication with a corresponding mobile application, which can provide payment for the products in the rolling cart or basket, eliminating the need to have to wait in checkout lines.

The interactive shopping system can use a removable sleeve, which can be easily and quickly connected or disconnected to the rolling cart or the basket. In embodiments, the removable sleeve can be a sheet, such as a plastic cover.

The interactive shopping system can use at least one onboard processor, which can be in communication with a store administrative processor of a retail store and a store administrative data storage.

The interactive shopping system can use a store library, which can be located in the store administrative data storage. The store library can contain product prices associated with product weights for products being sold in the store as well as product specifications.

The at least one onboard processor can be configured to match scanned products with product prices and product weights from the store library as products are placed in the rolling cart or basket creating a list of purchases; retrieve product specifications as requested by at least one user; calculate a subtotal for scanned products and display the subtotal in real time on an onboard display as products are placed in the rolling cart or basket; and communicate with a phone application based payment system in at least one user client device connected to the network to initiate payment transfers electronically from a financial institution in communication with the network to pay the retail store for products in the rolling cart or basket.

In embodiments, the at least one onboard processor can be configured to download coupons from the at least one user client device for use in paying for products in the rolling cart or basket.

The onboard data storage can have an interactive map with the location of products in the store, linked to the map, which can be displayed on the onboard display.

In embodiments, the at least one onboard processor can use a global positioning system transmitter and the interactive map to provide suggested routes to products on the at least one user's shopping list.

In embodiments, digital advertisements for the at least one user's defined list of product, the retail store selected list of products or combinations thereof can be displayed on the onboard display.

In embodiments, the at least one onboard processor can be configured to match store coupons, manufacturer coupons, and manager specials from the store library as products are scanned by the onboard scanner, and apply the financial discount immediately to the subtotal.

Turning now to the Figures, FIG. 1 depicts the interactive shopping system according to one or more embodiments.

At least one user 8a and 8b with at least one user client device 70a and 70b can have a phone application based payment system 86a and 86b on the at least one user client device 70a and 70b. In embodiments, the at least one user can be handicapped. In further embodiments, the client device can be a cellular phone.

The at least one user 8a is shown pushing a rolling cart 11 with at least one onboard processor 12a located on a removable sleeve 10.

The at least one onboard processor 12a can be in communication with a network 26.

In embodiments, the rolling cart 11 can be approximately 33 inches in length by 21 inches in width by 38 inches in height, with about a 120 pound capacity, and having an available volume of about 4.5 cubic feet.

The rolling cart can be made from metal, plastic, or any other suitable material.

The removable sleeve 10 can have suitable dimensions to fit onto the cart, like a "coat for the rolling cart."

In embodiments, the rolling cart 11 can have a height of 38 inches so the removable sleeve 10 would have a height of 38.5 inches. The length of the removable sleeve 10 would be similar to the length of the rolling cart 11. Therefore, if the rolling cart 11 was 33 inches in length, the removable sleeve 10 length would be about 33.3 inches. If the width of the rolling cart 11 was 21 inches, the removable sleeve 10 might have a width of about 21.3 inches.

The removable sleeve 10 can be made from polycarbonate or a similar, a washable non-porous material that can be flexible yet rigid enough to support the processor, an onboard scanner, an onboard scale, and a display screen on the rolling cart. In embodiments, the sleeve can be covered in printed messages.

The at least one user 8b is shown carrying a basket 13. The basket can have at least one onboard processor 12b located on a removable sleeve 10. The at least one onboard processor 12b of the basket 13 can also be in communication with the network 26.

In embodiments, the basket 13 can have a dimension of 17 inches in length by 12.5 inches in width by 8 inches in height.

The basket 13 can be made from metal, plastic, or any other suitable material.

In embodiments, the removable sleeve 10 for the basket 13 can have dimensions to fit onto the basket 13 such as 17.3 inches in length by 13 inches in width by 8.5 inches in height for a basket with dimensions of 17 inches in length by 12.5 inches in width by 8 inches in height.

A store administrative processor 28 can be in communication with the network 26 and a store administrative data storage 30. In embodiments, the store administrative data storage 30 can contain as a non-transitory computer readable medium, a plurality of various computer instructions to instruct the store administrative processor 28 to perform various tasks. In further embodiments, the store administrative data storage 30 can contain a store library 32.

The store library 32 can include details, such as type, brand, sizes/quantity, and price, about various products available for purchase at the store. For example, organic bananas, organic carrots, lactose free milk.

The products for purchase can be grouped by type of product such as, but not limited to: types of fruit, types of clothing, types of electronics, type of foot items, and type of dairy products.

A financial institution 77 can be in communication with the network 26, which can enable the at least one user 8a and 8b to pay from the at least one user client device 70a and 70b.

In embodiments, the financial institution 77 can be any bank, credit union, credit card services, or any online payment systems that the at least one user selects to make a payment.

Figure 2:
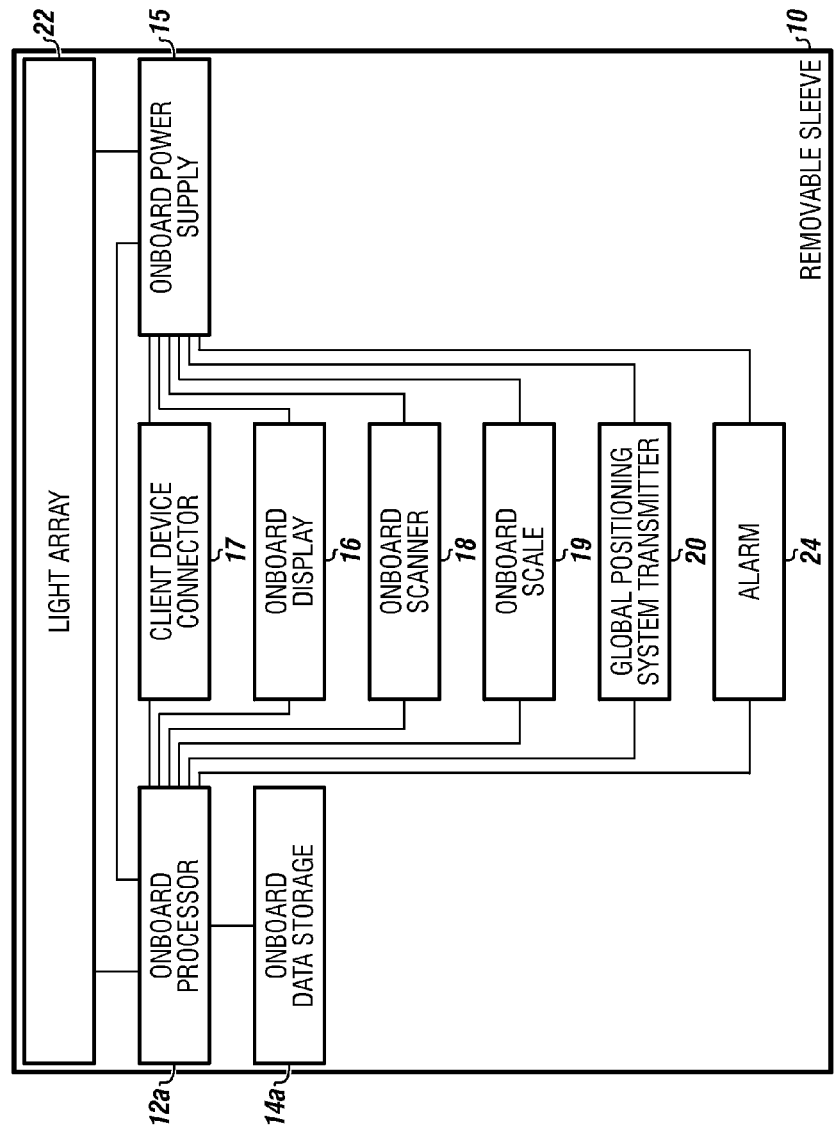
FIG. 2 depicts a removable sleeve which can attach to the rolling cart or the basket according to one or more embodiments.

FIG. 2 depicts a removable sleeve 10 which can attach to the rolling cart or the basket according to one or more embodiments.

The removable sleeve 10 can be a removable and detachable support, which can be applied over the rolling cart or the basket.

The removable sleeve 10 can house the at least one onboard processor 12a connected to an onboard data storage 14a and an onboard power supply 15, wherein the onboard power supply 15 can provide power to the at least one onboard processor 12a.

In embodiments, the onboard power supply 15 can be 12 volt rechargeable batteries or lithium-ion batteries.

The removable sleeve 10 can have a client device connector 17 in communication with the at least one onboard processor 12a, the at least one user client device, or combinations thereof.

In embodiments, the client device connector 17 can be in communication with the at least one onboard processor 12a for synching the at least one onboard processor 12a with the at least one user client device to download the at least one user's list of products for purchase to the at least one onboard processor 12a, which can then be shown on an onboard display 16.

In embodiments, at least one user's list of products can be called a shopping list.

In embodiments, product information and transaction costs can be displayed to the shopper on the onboard display 16, which can be mounted to the removable sleeve 10.

The onboard display 16 can show details about the at least one user, the store, and scanned items as well as coupons and other marketing the store can choose to display on it. In embodiments, the display can be a LCD screen mounted on the rolling cart or basket or a client device such as a cellular phone screen.

In embodiments, for example, if Mary is shopping in Target and she scans the rolling cart's QR code on her phone, the rolling cart can read "Mary, Welcome to Target Store #123" and the onboard display 16 can show items that Target has decided to market specifically to Mary based on the analysis of her shopping history. For example, "Today's Deal: Buy 1 Get 1 free on Levi's Women Denims." Then, if Mary chooses to read more about any of those deals, she can click on the deal and the onboard display 16 can show the details about the item including its location. In further embodiments, a 'Get me there' icon can be used to display a map to locate the item in the store.

The removable sleeve 10 can have an onboard scanner 18, an onboard scale 19, a global positioning system transmitter 20, a light array 22 and an alarm 24.

In embodiments, the onboard scanner 18, the onboard scale 19, the global positioning system transmitter 20, the light array 22 and the alarm 24 can be connected to or in communication with the at least one onboard processor 12a and the onboard power supply 15.

The global positioning transmitter 20 on the rolling cart can allow the retailer to know where the rolling cart is located at all times and also provides a way to show deals on the onboard display 16 based on the rolling cart's location within the store. The global positioning system transmitter 20 can also allow the store map function to guide the at least one user to a certain part of the store.

In embodiments, the light array 22 can be configured to provide a first visual indicator such as an array of green lights, a group of white lights that form the word "paid", or provide an array of steady white lights when all the products in the rolling cart or basket are paid.

In embodiments, the light array 22 can be configured to provide a second visual indicator when at least one product is unpaid or when a weight does not match scanned information. The second visual indicator can be a complete set of red lights; can form a rolling message, or an animated message.

In embodiments, the light array 22 can consist of about 400 LEDs disposed around the circumference of the removable sleeve 10 forming the light array 22. The light array 22 can be configured to have an the ability to create various combinations with the LEDs including blinking all red lights simultaneously in case the items in the rolling cart or basket are not paid for. In additional embodiments, all green LEDs can mean all items on the rolling cart or basket are paid for. In additional embodiments, every alternate LED can blink red and white during Christmas Day or any other light combinations for other holidays.

In embodiments, the light array 22 can be configured to provide a third visual indicator when at least one scanned product is pending payment. The third visual indicator can be a group of yellow lights.

In embodiments, the alarm 24 can be visual or audible. In embodiments, the alarm 24 can change the color of the light array 22 based on commands from the at least one onboard processor 12a and onboard data storage 14a.

In embodiments, the alarm 24 can be configured to activate when a shopper or the at least one user is proximate to a product identified on the at least one user defined list. In embodiments, the alarm 24 can be configured to activate when a shopper or the at least one user with an unpaid item tries to leave the retail store.

FIG. 3 depicts the store library 32 according to one or more embodiments.

In embodiments, the store library 32 can contain, but is not limited to: product names 40, product weights 41, product specifications 42, product prices 43, product discounts 44, store coupons 45, manufacturer recalls 46, manufacturer coupons 47, manager specials 48, digital advertisements 49 for products of the retail store, and an interactive map 50 which can show products location in the retail store. In additional embodiments, the store library 32 can be customized to contain information on products of a downloaded user's list or for a retail store selected list of products.

In embodiments, the at least one onboard processor can display at least one of product discounts 44 or digital advertisements 49 simultaneously as a plurality of clickable thumbnail images on the onboard display as the shopping occurs in the retail store.

In embodiments, the store library 32 can include product names 40, such as TIDED; product discounts 44, such as $0.10 off through Sunday; store coupons 45, such as buy one get one free; manufacturer recalls 46, such as cereal with product codes ending in P22; manufacturer coupons 47, such as 40 cents off any BORDON® product; manager specials 48, such as hamburger today only 50 cents a pound; digital advertisements 49, such as a flashing message to buy toilet tissue now; and the interactive map 50 showing product locations in the store.

Figure 4B:
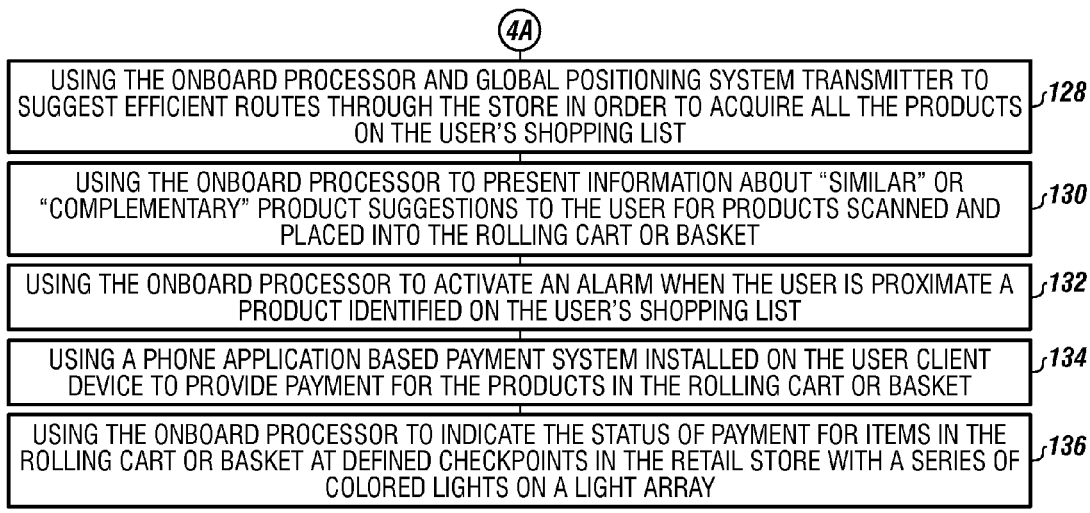

FIGS. 4A-4B depict the steps of the method for using an interactive shopping system according to one or more embodiments.

The method can include selecting a rolling cart or basket having an at least one onboard processor, onboard data storage, onboard scanner, onboard scale, and global positioning system transmitter, which can all be connected to an onboard power supply, as shown in step 100.

In embodiments, the onboard processor can be in communication with the local network of the retail store. In embodiments, the local network can be in communication with the administrative processor connected to the administrative data storage.

The method can include synchronizing at least one user client device to the onboard processor, as shown in step 102.

If at least one user has a shopping list located on the at least one user client device, the method can include uploading a shopping list from the user client device to the onboard processor, as shown in step 104.

The onboard data storage can have an interactive map with the location of products in the store, linked to the map.

If the user chooses to upload their shopping list from the user client device to onboard processor, the method can include using the onboard processor to match products from the at least one user's shopping list to product locations on the interactive map and then display the interactive map as a customized map, identifying the location of the products from the user's shopping list on the onboard display, as shown in step 106.

The method can include using the onboard processor to store the customized interactive map in the onboard data storage, as shown in step 108.

In embodiments, the customized interactive map can be transmitted to the user client device and displayed on the synchronized user client device.

The method can include using the onboard processor to color code products on the user's shopping list as a first color or color code products as a second color to denote products that are deemed "specials" by the retailer, as shown in step 110.

In embodiments, the onboard processor can color code various items, which are not limited. For example, a first color can be used for a product on a user's shopping list, a second color can be used for products a user usually purchases, a third color can be used to denote products on "special" by the retailer, a fourth color can be used for a product that has a store coupon, and so forth.

The method can include scanning products with the onboard scanner as each product is scanned by the onboard scanner, weighed by the onboard scale, and combinations thereof as the products are placed into the rolling cart or basket, as shown in step 112.

The method can include using the onboard processor to match the scanned and/or weighed product that has been placed into the rolling cart or basket to the store library containing product codes and weights for the products in the retail store and obtains a price linked to the weight of the scanned product, as shown in step 114.

The method can include using the onboard processor to provide an alarm when the weight of the scanned product placed into the rolling cart or basket does not match the information in the store library, as shown in step 115.

The method can include using the onboard processor to present a running total of the scanned and weighed products to the user, as shown in step 116.

If the user chooses to upload their shopping list from the user client device to the onboard processor, the method can include using the onboard processor to present a meter showing how many products are left to select from the user's shopping list, as shown in step 118.

The method can include using the onboard processor to receive advertisements and specials from the administrative processor and present the advertisements and specials at timed intervals on the onboard display or the display of the user client device throughout the shopping experience, as shown in step 120.

The method can include scanning coupons using the onboard scanner or uploading coupons saved on the user client device to the onboard processor, as shown in step 122.

The method can include using the onboard processor to automatically apply coupons applicable to products that were selected, scanned and placed in the rolling cart or basket and presenting the discounted subtotals to the user, as shown in step 124.

If the user chooses to upload their shopping list from the user client device to the onboard processor, the method can include using the onboard processor to automatically indicate that the selected products are "checked off" the user's shopping list, as shown in step 126.

If the user chooses to upload their shopping list from the user client device to the onboard processor, the method can include using the onboard processor and global positioning system transmitter to suggest efficient routes through the store in order to acquire all the products on the user's shopping list, as shown in step 128.

The method can include using the onboard processor to present information about "similar" or "complementary" product suggestions to the user for products scanned and placed into the rolling cart or basket, as shown in step 130.

In embodiments, the information about "similar" or "complementary" product suggestions presented by the onboard processor, can include brand names, prices, product details, user reviews, the location, which can be indicated on the interactive map, of the suggested "similar" or "complementary" in the store, or combinations thereof.

If the user chooses to upload their shopping list from the user client device to the onboard processor, the method can include using the onboard processor to activate an alarm when the user is proximate a product identified on the user's shopping list, as shown in step 132.

The method can include using a phone application based payment system installed on the user client device to provide payment for the products in the rolling cart or basket, as shown in step 134.

The method can include using the onboard processor to indicate the status of payment for items in the rolling cart or basket at defined checkpoints in the retail store with a series of colors or other visual indicators on a light array, as shown in step 136.

Figure 5:
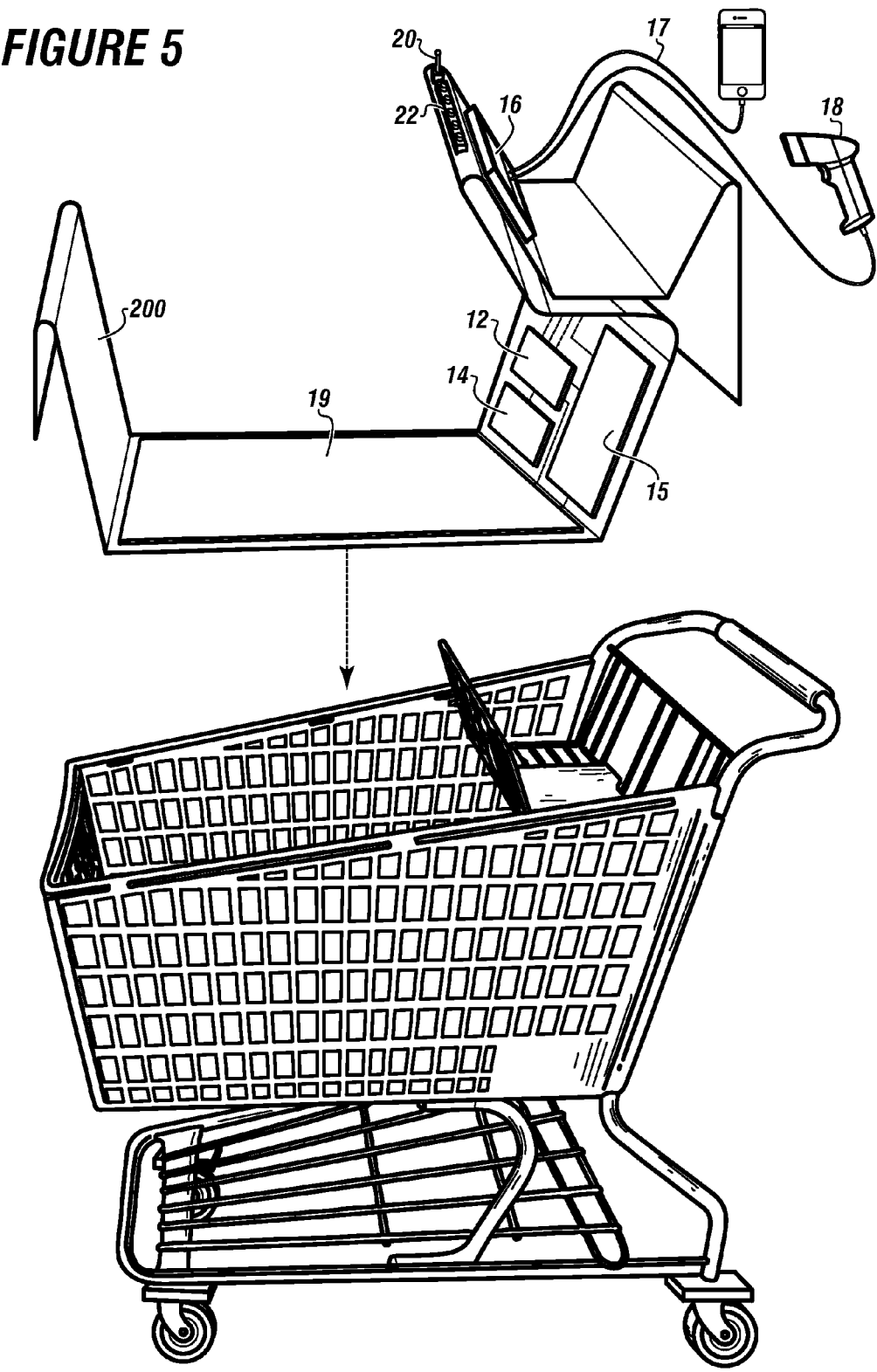
FIG. 5 depicts a perspective view of the removable sleeve shown over a rolling cart according to one or more embodiments.

FIG. 5 depicts a perspective view of the removable sleeve, shown as a sheet, over a rolling cart according to one or more embodiments.

In this embodiment, the removable sleeve is shown as a sheet 200, which can cover the rolling cart in one or more embodiments.

The rolling cart can have the onboard scanner 18 and the onboard scale 19 connected to the at least one onboard processor 12 and an onboard power supply 15.

The at least one onboard processor 12 can be in communication with the onboard data storage 14, wherein the onboard processor can be configured to bi-directionally communicate with the network.

The onboard display 16 is shown connected to the at least one onboard processor 12 and the onboard power supply 15.

The client device connector 17 is shown in communication with the at least one onboard processor 12 for syncing the at least one onboard processor 12 with the at least one user client device to download the at least one user's list of products for purchase to the at least one onboard processor 12.

A global positioning system transmitter 20 can connect to the at least one onboard processor 12 and the onboard power supply 15.

A light array 22 is shown mounted to the sheet 200, wherein the light array can be connected to the at least one onboard processor 12 and the onboard power supply 15.

While these embodiments have been described with emphasis on the embodiments, it should be understood that within the scope of the appended claims, the embodiments might be practiced other than as specifically described herein.

What is claimed is:

1. An interactive shopping system for use in a retail store comprising:
   a. a rolling cart or a basket for holding products selected by at least one user;
   b. a removable sleeve for attaching to the rolling cart or the basket;
   c. an onboard scanner and an onboard scale connected to at least one onboard processor and the removable sleeve to scan products in the rolling cart or the basket;
   d. the at least one onboard processor in communication with an onboard data storage configured to bi-directionally communicate with a network, and further in communication with a store administrative processor with a store administrative data storage having a store library comprising: product prices associated with product weights and product specifications, wherein the at least one onboard processor is configured to:
      (i) match scanned products with the product prices associated with the product weights from the store library as items are placed in the rolling cart or the basket creating a list of purchases;
      (ii) retrieve the product specifications as requested by the at least one user;
      (iii) calculate a subtotal for the scanned products and display the subtotal for the scanned products in real time as scanned products are placed in the rolling cart or the basket; and (iv) communicate with a phone application based payment system in at least one user client device connected to the network to initiate payment transfers electronically from a financial institution in communication with the network to pay the retail store for scanned products in the rolling cart or the basket;

e. an onboard power supply providing power to the at least one onboard processor, the onboard scanner, and the onboard scale;

f. an onboard display connected to the at least one onboard processor and the onboard power supply;

g. a client device connector in communication with the at least one onboard processor for synching the at least one onboard processor with the at least one user client device to download at least one user's list of products for purchase to the at least one onboard processor;

h. a global positioning system transmitter connected to the at least one onboard processor and the onboard power supply; and i. a light array mounted to the removable sleeve and connected to the at least one onboard processor and the onboard power supply, wherein the light array is configured to provide:
   (i) a first visual indicator when all products in the rolling cart or the basket are paid;
   (ii) a second visual indicator when at least one product is unpaid or a weight does not match scanned information; and
   (iii) a third visual indicator when at least one scanned product is pending payment.

2. The interactive shopping system of claim 1, further comprising an alarm connected to the at least one onboard processor and the onboard power supply, wherein the at least one onboard processor is configured to activate the alarm when the at least one user is proximate to a product identified on the at least one user's list.

3. The interactive shopping system of claim 1, wherein the network is a cellular network, a satellite network, a Wi-Fi network, a global communication network, a local area network, a wide area network, or combinations thereof.

4. The interactive shopping system of claim 1, wherein the at least one onboard processor is configured to download coupons from the at least one user client device for use in paying for products in the rolling cart or the basket.

5. The interactive shopping system of claim 1, wherein the onboard display is a display of the at least one user client device.

6. The interactive shopping system of claim 1, wherein the at least one user client device is a cellular phone, a smart phone, a tablet computer, a smart watch, a laptop, a computer, a personal digital assistant, or combinations thereof.

7. The interactive shopping system of claim 1, wherein the onboard display is an LCD screen.

8. The interactive shopping system of claim 1, wherein the store library further comprises: product names, product discounts, store coupons, manufacturer recalls, manufacturer coupons, manager specials, digital advertisements, and an interactive map.

9. The interactive shopping system of claim 8, wherein the at least one onboard processor uses the global positioning system transmitter and the interactive map to provide suggested routes to products on the at least one user's list.

10. The interactive shopping system of claim 8, wherein the at least one onboard processor is configured to the match store coupons, the manufacturer coupons, and the manager specials from the store library to the products as the products are scanned and apply the financial discount immediately to the subtotal.

11. The interactive shopping system of claim 8, wherein the digital advertisements are for the at least one user's list of products, a retail store selected list of products; and combinations thereof.

12. The interactive shopping system of claim 1, wherein the onboard power supply is rechargeable.

13. The interactive shopping system of claim 1, wherein the light array comprises green lights as the first visual indicator when all products in the rolling cart or the basket are paid; red lights as the second visual indicator when at least one product is unpaid or a weight does not match scanned information; and yellow lights as the third visual indicator when at least one scanned product is pending payment.

14. The interactive shopping system of claim 1, wherein the at least one onboard processor is configured to receive targeted marketing from the store administrative processor enabling the retailer to compete directly with online retailers.

15. The interactive shopping system of claim 1, wherein the removable sleeve is a sheet.

* * * * *